April 28, 1931.  S. G. BAITS ET AL  1,802,495
INTERNAL COMBUSTION ENGINE
Filed Dec. 27, 1928
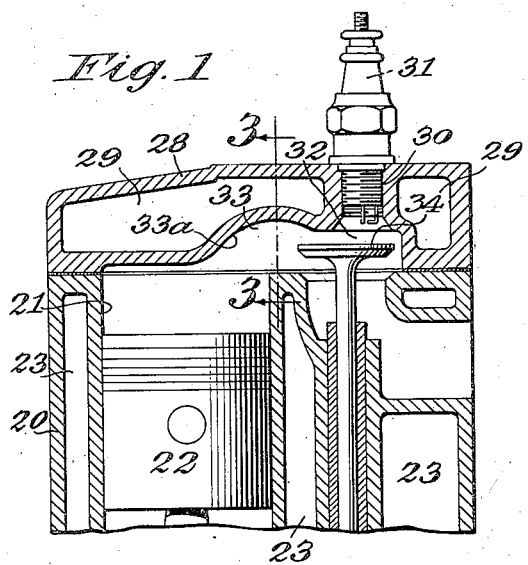
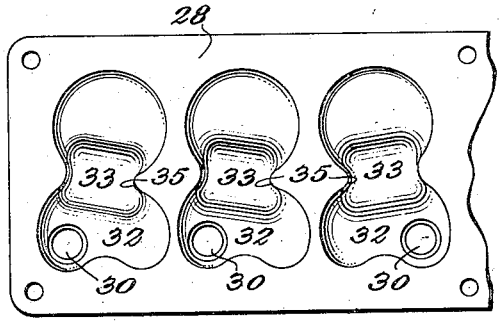
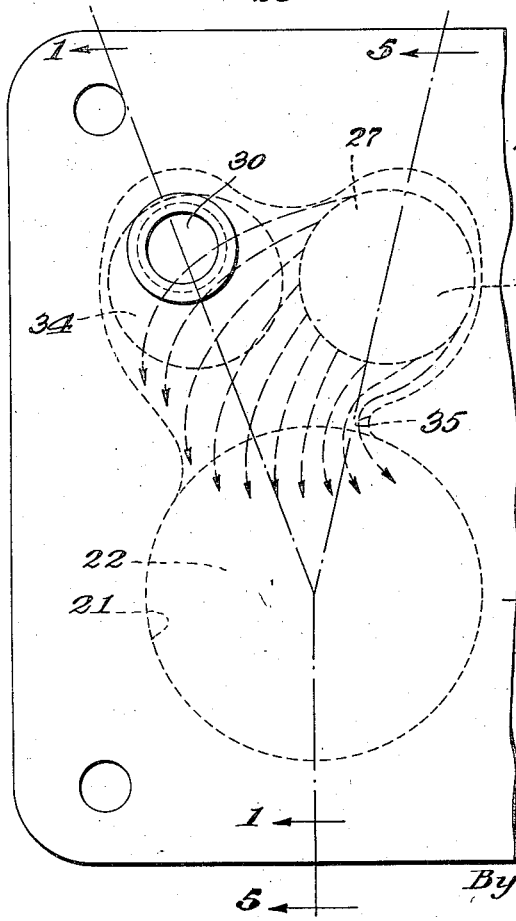
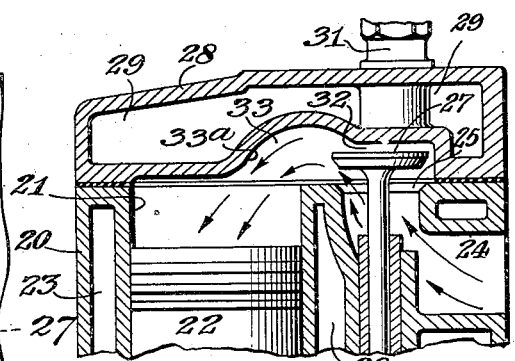
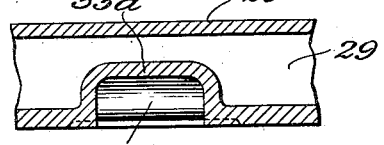
Inventors:
Stuart G. Baits & Ralph H. Whisler
By Macleod Calver Copeland & Dike
Attorneys.

Patented Apr. 28, 1931

1,802,495

UNITED STATES PATENT OFFICE

STUART G. BAITS, OF GROSSE POINTE PARK, AND RALPH H. WHISLER, OF HALFWAY, MICHIGAN, ASSIGNORS TO HUDSON MOTOR CAR COMPANY, OF DETROIT, MICHIGAN, A CORPORATION OF MICHIGAN

INTERNAL-COMBUSTION ENGINE

Application filed December 27, 1928. Serial No. 328,764.

This invention relates to internal combustion engines particularly adapted for use in motor vehicles. The object of the invention is to increase the efficiency of so-called L-head engines.

In the patent to Stephen I. Fekete No. 1,656,051, patented January 10, 1928, there is shown and described a so-called F-head engine having a peculiar arrangement of the combustion space, valves and spark plug which greatly improves the characteristics of the engine and has made it possible to construct a relatively large engine of the high-speed and high compression type suitable for use in automobiles. Commercial production on a large scale of the engines shown and described in the Fekete patent has proved conclusively that this engine has very remarkable characteristics and that it can be given a compression ratio which is believed to be in excess of that of any comparable engine on the market and with a substantial increase in efficiency and a very remarkable absence of "spark knock". The construction and operation of this engine is fully described in the Fekete patent and therefore need not be explained further herein. At the time when the Fekete engine was first constructed much higher compression ratios were being used in small engines of the L-head type than was considered possible in large engines. The invention described in the Fekete patent made it possible to make a relatively large engine with as high a compression as the small L-head engine and with the increase in efficiency consequent upon the use of higher compression; but it was not thought necessary or even possible to improve the existing small high compression L-head engines along these lines.

Our present invention therefore has for its object to improve the efficiency of L-head engines particularly those of small diameter and to obtain in engines of this type the results in improved efficiency and economy previously obtained in large engines by the Fekete invention. We have found that by small and inexpensive changes and a re-arrangement of the relations of the parts, a comparable improvement in L-head engines may be accomplished. Engines embodying our invention are so constructed that a part at least of the cool mixture which enters through the intake valve flows across the exhaust valve and has the double effect of cooling the valve and thus preventing a detonation since the exhaust valve is always the hottest point and of vaporizing any unvaporized portions of the mixture.

Other objects of this invention will appear in the following description and appended claims reference being had to the accompanying drawings forming a part of this specification.

Fig. 1 is a fragmentary vertical section, taken substantially on the line 1—1, Fig. 4, illustrating a portion of the cylinder block and cylinder head.

Fig. 2 is a fragmentary bottom plan view of the cylinder head.

Fig. 3 is a sectional view taken substantially on line 3—3 of Fig. 1 in the direction of the arrows.

Fig. 4 is a fragmentary top plan view showing the relation of the parts.

Fig. 5 is a fragmentary vertical section taken substantially on the line 5—5, Fig. 4.

Before explaining in detail the present invention, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

In the drawings is shown an internal combustion engine of the L-head type, that is, one in which the inlet and exhaust valves are placed side by side on one side of the cylinder. The valves open into a flat low combustion space or chamber which communicates with the cylinder by an arched passage which is restricted in width and preferably has a cross-sectional area about equal to that of the inlet passage leading to the inlet valve. The side walls of this passage are constructed to direct the mixture from the inlet valve opening partly or to as large an extent as possible in a lateral direction over the hot exhaust valve. The portion of the incoming charge which flows over the hot exhaust valve, cools it and this results in vaporizing liquid particles which would otherwise be carried into the engine in unvaporized condition. It will be seen therefore that the mixture helps to cool the exhaust valve, prevents it from heating to an excessive extent, and prevents pre-ignition, detonation, and warping of the exhaust valve. The construction results in improved combustion and improved fuel economy. The construction also reduces fouling of the combustion chamber, cylinder head, spark plug and valve stems, and dilution of the motor oil.

In the drawings I have shown an L-head engine, a portion of the cylinder block casting being illustrated at 20 in Figs. 1 and 5 and the piston at 22. Portions of the water-jackets for the cylinder are shown at 23, and the inlet passage for the mixture is illustrated in Fig. 5 at 24. At 25 is shown an inlet valve seat for the inlet valve 27 which opens upwardly into the combustion space or chamber.

Mounted on the cylinder block is a cylinder head 28, which in the present instance is shown as a separate structure from the cylinder block. The cylinder head 28 is provided with the usual water-jackets 29 and has a series of tapped holes 30 for the spark plugs 31.

The cylinder head is formed with a combustion space or chamber 32 at one side of each of the cylinder bores 21. The combustion space 32 communicates with the upper part of the cylinder bore 21 by means of an arched passage 33 formed in the cylinder head which is substantially narrower than the combustion space 32 and has also a width less than the diameter of the cylinder bore. The combustion space is narrowed in more on the inlet valve side than on the exhaust valve side, so that the arched passage is as much as possible over the exhaust valve. It will be noted that the top wall 33a of the combustion passage 33 is curved so as to facilitate the flow of the charge into the cylinder. This passage overlies only a part of the cylinder bore, so that a relatively high compression ration is obtained without interfering with the proper flow of the mixture into the engine at high speeds. In practice we make the arched passage 33 of about the same cross-sectional area as that of the inlet passage 24 to avoid as much as possible any change in volume in the mixture. The inlet passage is in effect continued at the same cross-sectional area all the way into the cylinder.

Referring to Figs. 1, 2 and 4, it will be noted that the hole 30 for the spark plug 31 is placed over the exhaust valve 34 but at a point as remote as possible from the cylinder. As shown in the drawings the axis of the spark plug is more remote from the cylinder than the axis of the exhaust valve. Better firing results from this arrangement and any tendency to spark-knock is reduced, producing a softer smoother engine. It will also be seen that the side wall 35 of the passage 33 on the side of the intake valve acts substantially as a baffle and tends to deflect the incoming charge laterally in the direction of the exhaust valve. This is aided by the fact that the mouth of the passage 33 in large part faces the exhaust valve 32, so that a part of the incoming mixture is caused to flow laterally over the exhaust valve in order to pass into the cylinder. Although the valve chamber or combustion space 32 is so constructed with relation to the passage into the cylinder that the stream of incoming mixture is directed in part laterally over the exhaust valve yet proper breathing of the engine at high speeds is permitted, since the change in direction is not sufficient to interfere with a proper flow of the gas to the cylinder.

We claim:

1. An internal combustion engine of the L-head type having an upwardly arched passage forming part of the combustion space, inlet and exhaust valves opening upwardly into said combustion space, said passage leading from the inlet valve to the top of the cylinder on the side adjacent the valve, and a spark plug located over the exhaust valve with its axis further from the cylinder than the axis of the exhaust valve.

2. In an internal combustion engine, in combination with a cylinder having a piston therein and a cylinder head, a relatively flat combustion space at one side of the cylinder, and an inlet valve and an exhaust valve located side by side and opening upwardly to said combustion space, the cylinder head having a narrower passage arched from said combustion space to the cylinder and extending part way only across the top of the cylinder, and a spark plug located over the exhaust valve at the hottest part of the combustion space.

3. In an internal combustion engine of the L-head type, in combination with a cylinder having a piston therein and a cylinder head, a combustion space at one side of the cylinder, an inlet valve and an exhaust valve opening upwardly into said space, and a spark plug extending into said space above said exhaust valve, the axis of the spark plug being located more remote from the cylinder than the axis of the exhaust valve.

4. In an internal combustion engine of the L-head type, a relatively flat combustion chamber extending over the inlet and exhaust valves, the cylinder head having a passage narrower than the combustion chamber and leading from the latter to the cylinder, the passage being arched above the height of the chamber, the side wall of the combustion chamber adjacent the inlet valve extending inwardly between the cylinder and inlet valve to deflect the gases laterally in the direction of the exhaust valve.

5. In an internal combustion engine of the L-head type, a relatively flat combustion chamber extending over the inlet and exhaust valves, the cylinder head having a passage narrower than the combustion chamber and leading from the latter to the cylinder, the passage being arched above the height of the chamber, the side wall of the combustion chamber adjacent the inlet valve extending inwardly between the cylinder and inlet valve to deflect the gases laterally in the direction of the exhaust valve, and a spark plug located adjacent the exhaust valve in that part of the chamber furthest from the cylinder.

6. In an internal combustion engine of the L-head type, a combustion chamber, inlet and exhaust valves opening into said chamber, the combustion chamber being provided with a narrower upwardly arched passage leading to the cylinder, vertical walls of said passage being constructed to direct incoming gases across the exhaust valve.

7. In an internal combustion engine of the L-head type, a combustion chamber, inlet and exhaust valves opening upwardly into said chamber, the side wall of the combustion chamber adjacent the inlet valve extending inwardly between the cylinder and inlet valve to deflect the gases laterally in the direction of the exhaust valve, and a spark plug extending into the combustion chamber over the exhaust valve whereby the combustion will originate at the hottest part of the combustion chamber.

8. In an internal combustion engine of the L-head type, a relatively flat combustion chamber extending over the inlet and the exhaust valves, the cylinder head being formed to provide a passage narrower than the combustion chamber, said passage being narrower chiefly on the inlet valve side and leading from the valve to the cylinder, said passage being arched to increase its height from a point over the edges of the exhaust and inlet valves which are nearest the cylinder and extending to a point slightly beyond the nearest edge of the cylinder, the wall of the combustion chamber at the side of the inlet valve being curved inwardly between the two valves, and the spark plug being located adjacent the exhaust valve in that part of the chamber furthest from the cylinder, whereby the incoming gases from the inlet valve port are directed sidewise across the adjacent portions of the exhaust valve, thereby cooling it without retarding the rapidity of flow from the inlet valve to the cylinder, and whereby the combustion will originate at the hottest point in the combustion chamber.

In testimony whereof we affix our signatures.

STUART G. BAITS.
RALPH H. WHISLER.